WAFFLE-IRON MAGNETIC MEMORY ACCESS SWITCHES

Filed July 20, 1964 5 Sheets-Sheet 1

INVENTOR
J. L. SMITH
BY Herbert N. Shapiro
ATTORNEY

FIG. 2
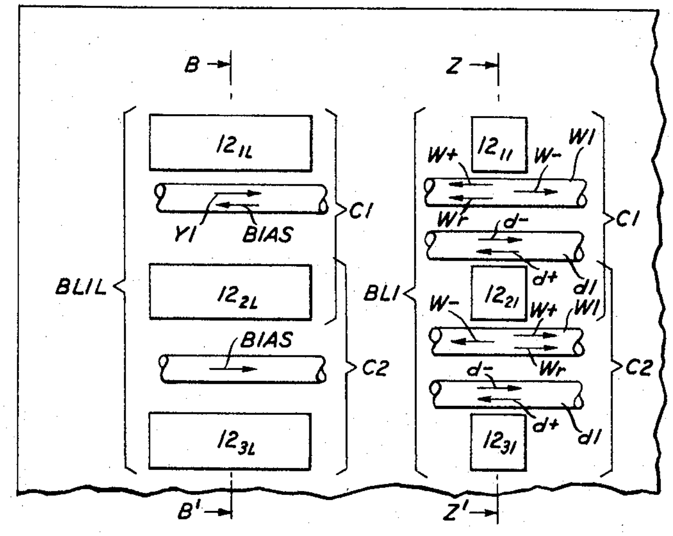
FIG. 3a
BL1L
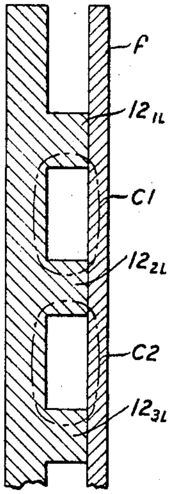
FIG. 3b
BL1
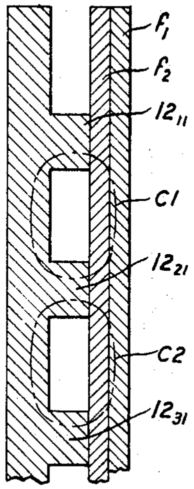
FIG. 4
ACCESS SWITCH
| | C1 | C2 |
|---|---|---|
| CLEAR | → | ← |
| WRITE (BIAS) | ← | → |
| READ | → | → |
| RESIDUAL (BIAS) | ← | → |

WRITE & READ "1" WITH A "0" STORED PREVIOUSLY

| | | C1 | C2 |
|---|---|---|---|
| ASSUMED "0" STORED PREVIOUSLY | | → | → |
| CLEAR | | ← | → |
| WRITE "1" | H | ← | ← |
| | L | → | → |
| READ "1" | H | ← | ← |
| | L | ← | → |

WRITE & READ "1" WITH A "1" STORED PREVIOUSLY

| | | C1 | C2 |
|---|---|---|---|
| ASSUMED "1" STORED PREVIOUSLY | | ← | ← |
| CLEAR | | ← | ← |
| WRITE "1" | H | ← | ← |
| | L | → | → |
| READ "1" | H | ← | ← |
| | L | ← | → |

WRITE & READ "0" WITH A "0" STORED PREVIOUSLY

| | | C1 | C2 |
|---|---|---|---|
| ASSUMED "0" STORED PREVIOUSLY | | → | → |
| CLEAR | | → | → |
| WRITE "0" | H | → | → |
| | L | ← | ← |
| READ "0" | H | → | → |
| | L | ← | → |

WRITE & READ "0" WITH A "1" STORED PREVIOUSLY

| | | C1 | C2 |
|---|---|---|---|
| ASSUMED "1" STORED PREVIOUSLY | | ← | ← |
| CLEAR | | ← | → |
| WRITE "0" | H | → | → |
| | L | ← | ← |
| READ "0" | H | → | → |
| | L | ← | → |

United States Patent Office 3,413,617

Patented Nov. 26, 1968

3,413,617

WAFFLE-IRON MAGNETIC MEMORY ACCESS SWITCHES

James L. Smith, Bedminister, N.J., assignor to Bell Telephone Laboratories, Incorporated, New York, N.Y., a corporation of New York Filed July 20, 1964, Ser. No. 383,778

20 Claims. (Cl. 340—174)

ABSTRACT OF THE DISCLOSURE

A multibit, two-core-per-bit arrangement, including drive means comprising a first conductor and a bifurcated second conductor coupled to the two cores of each bit location provides, when selectively activated, series switching and single switching of the two cores. High amplitude and low amplitude pulses are induced thereby in a word conductor coupled to the cores of each location. The arrangement is operated as an access switch to provide a pulse train which is particularly useful in connection with a piggy-back waffle iron memory. If the access switch is of the waffle iron configuration, the switch and the memory may be fabricated, simultaneously, on a single waffle iron base plate.

This invention relates to magnetic memories and, more particularly, to magnetic memories in which storage and retrieval of information require drive pulses of different amplitudes and polarities.

One memory requiring such pulses on one of its drive conductors is a nondestructive read waffle iron memory and is disclosed in the copending application of A. H. Bobeck and J. L. Smith, Ser. No. 215,318, filed Aug. 7, 1962, now Patent 3,274,571 issued Sept. 20, 1966. In this connection, a waffle iron memory is one which includes a relatively low reluctance base plate having posts thereon and an overlay of a material having substantially rectangular hysteresis characteristics juxtaposed with said posts. The nondestructive read waffle iron memory is one having the same physical arrangement as the waffle iron memory, but also including a second overlay between the posts and the first overlay. The second overlay, in addition, comprises a material having substantially rectangular hysteresis characteristics as does the first overlay member. The material of the second overlay, however, is characterized by a coercive force lower than that of the first. Because the first overlay is positioned on top of the second in the nondestructive read configuration, such a memory is commonly referred to as a "piggy-back" waffle iron memory. Another memory including contiguous high coercive force and low coercive force layers and requiring such pulses is the piggy-back twistor memory disclosed in Patent No. 3,067,408 of W. A. Barret, J., issued Dec. 4, 1962.

Specifically, the operation of a piggy-back type memory entails the provision of a relatively low amplitude pulse during the memory-road operation. During the read operation, the flux in only the overlay of relatively low coercive force material is reversed and the "read" pulse is limited in amplitude to effect flux reversal only in that overlay. Upon termination of this read pulse, the flux in that overlay is once again reversed to its initial condition by the field of the overlay of relatively high coercive force material. In this manner, nondestructive read out is provided. In contradistinction, during the write operation the flux in the relatively high coercive force overlay is reversed, requiring a relatively high amplitude write pulse. Consequently, the piggy-back memory requires relatively high and relatively low amplitude pulses of different polarities.

The provision of pulses of different amplitudes and polarities for such a memory requires rather complicated and expensive accessing equipment, and, typically, such accessing equipment introduces additional problems. For example, a ferrite core access switch, which provides such pulses, in response to drive pulses of different amplitudes, simultaneously shuttles flux in the nonselected bit locations of the memory. In fact, flux is shuttled, in this manner, to the extent that only in memories of limited storage capacity can the output signal be distinguished from the output due to accumulated shuttle flux during a read operation.

A better understanding of this problem underscores, at the same time, the problems of the prior art and the efficacy of this invention. Accordingly, this problem is discussed more fully. Specifically, an access switch is itself accessed in a manner similar to that of a memory, as is well known. That is, the access switch is accessed by X and Y conductors by means of which half-select currents are applied to a location of the access switch on a coincident current basis. In turn, as in the memories themselves, nonselected locations of the access switch experience half-select pulses resulting in a shuttling of flux therein in conventional fashion. As long as ferrite cores, having high relative squareness, are used for the access switch, and as long as pulses of similar amplitudes are provided thereby, there is, for all practical purposes, little shuttle flux induced in bit locations of the nonselected words of the memory to which the nonselected locations of the access switch are coupled via word conductors. If materials, other than ferrite cores, having relatively low relative squareness are used for the access switch, for example, a waffle iron configuration employing, as an overlay, a metal such as a commercially available molypermalloy, the nonselected locations of the access switch introduce considerable shuttle flux in the nonselected words of the memory. In this connection, a figure of merit which is useful to measure the departure from an ideal hysteresis characteristic is called the "relative squareness." The relative squareness for a "square" (ideal) characteristic is "one." That is, the shuttling of flux from one remanent state into saturation at the same remanent state and back produces no flux change. For ferrites, the relative squareness is about 0.98. For molypermalloys the relative squareness is about 0.85. Accordingly, waffle iron memories having molypermalloy overlays, typically, tend to be more noisy, that is to say, exhibit more flux shuttling than memories using ferrite material. The introduction of such shuttle flux is of little consequence during a write operation because the memory output is not taken at that time. The problem arises during the read operation wherein the shuttle flux in nonselected bit locations of the memory is "accumulated" by sense conductors to mask ligitimate output signals.

Consider specifically, for example, a biased ferrite core access switch. Conventionally, a location in such a switch is driven by a clear (read) pulse to a clear state by a bias, and coincident X and Y pulses inducing a positive clear pulse in the corresponding word conductor of the memory. Upon removal of the Y and X pulses, the bias (corresponding to a write pulse) reverses the flux in the location inducing a negative write pulse in that corresponding word conductor. The read pulse, provided by such a switch typically is of a polarity opposite to, and of an amplitude about equal to, that of the write pulse. In this context, the biased core access switch induces "half-select" pulses in nonselected word conductors in the conventional manner described above.

For compatibility with a piggy-back configuration, however, such a switch is called upon to provide a relatively low amplitude read pulse. The bias core access switch can be utilized to provide such a pulse by accessing the selected location of the access switch with relatively low amplitude X and Y pulses utilizing only a small fraction of the flux available in the selected location thereof to induce the required low amplitude pulse in the proper word conductor. Under these conditions, nonselected word conductors of the memory experience pulses which are large fractions of the pulse experienced by the selected word conductor even when ferrite cores are used for the access switch.

The reason for this is that in the piggy-back configuration the amount of flux necessary to provide a sufficient current to write into the memory determines the size and characteristics of a magnetic core in a location of the access switch. In terms of a hysteresis characteristic of such material for a location of a the access switch, the amount of flux (termed the irreversible component of flux) measured between the positive and negative maximum remanent states thereof is set by the requirements of the memory during the write operation. That is to say, a location of the access switch is of a geometry to provide sufficient flux to drive all the bit locations associated therewith. During the read operation, however, only a fraction of this flux is required, typically one tenth thereof. If the selected location of the access switch is driven by low amplitude X and Y pulses which drive the location of the access switch only enough to provide the required flux for reading the memory (that is, to reverse flux in only the low coercive force overlay), the reversible component or flux is approximately as large as the irreversible component. In this connection, the reversible component of flux is that which arises in response to flux shuttling corresponding to the generally horizontal saturation portions of a hysteresis characteristic. These reversible and irreversible components induce a pulse in the selected word conductor. For non-selected locations in the access switch there is no irreversible component of flux but there is a reversible component which is approximately equal to that reversible component in the selected location. Since, for the selected location, the reversible component and the irreversible component are about equal, the reversible component for a like core in each of the nonselected locations is about half the flux switched in the selected location. Consequently, the pulse induced in a word conductor coupling a nonselected location of the access switch is about half that of the pulse induced in the word conductor coupling the selected bit location of the access switch. It is clear that so much shuttle flux is induced in the bit locations of nonselected words that information in the memory is almost irretrievable.

It is an object of this invention to provide a new and novel access switch for a magnetic memory requiring pulses of the type described.

A more particular object of this invention is to provide a relatively inexpensive access switch for a piggy-back waffle iron memory which access switch subjects nonselected bit locations of the memory to a reduced amount of flux shuttling.

It is a further object of this invention to provide a relatively inexpensive access switch-memory, piggy-back waffle iron memory unit.

In accordance with this invention, a two-core-per-bit arrangement is utilized as a functional unit (location) of an access switch and each location is wired to provide, controllably, series switching or, alternatively, single switching of the two cores of each location. The series switching operation provides an equivalent large flux hysteresis characteristic corresponding to the flux of both cores of a location enabling the access switch to produce the large amount of flux required for the memory-write operation. The single switching operation provides the relatively low flux hysteresis characteristic corresponding to the flux of only one core of a location enabling the access switch to produce the small amoutn of flux required for the memory-read operation. In this manner, the amount of flux coupling the selected word conductor is much greater than that coupling the nonselected word conductors and the signal to noise ratio is considerably improved.

The above and further objects of this invention are realized in one embodiment thereof wherein a random access, two-core-per-bit location piggy-back waffle iron memory and a two-core-per-location waffle iron access switch share a common base plate. A bifurcated column conductor and a bias conductor thread the posts of the access switch in a manner to switch, controllably, the flux in both "cores" of a selected location therein for writing into the memory, and to switch the flux in only one core thereof for reading. In this manner the nonselected word conductors of the memory are not subjected to relatively high flux conditions during the read operation. An alternative arrangement provides the same controllable switching obtaining selectivity between locations by means of a priming technique.

Accordingly, a feature of this invention is a two-core-per-location access switch including a first conductor and a bifurcated second conductor for switching, controllably, the flux in both "cores" of each location thereof or, alternatively, in only one core thereof.

Another feature in accordance with this invention is a two-core-location waffle iron access switch and a piggy-back waffle iron memory sharing a common base plate.

The above and further objects and features of this invention will be understood more fully with reference to the following description rendered in conjunction with the accompanying drawing wherein:

FIG. 2 is a portion of the memory and access switch of FIG. 1;

Figure 1:
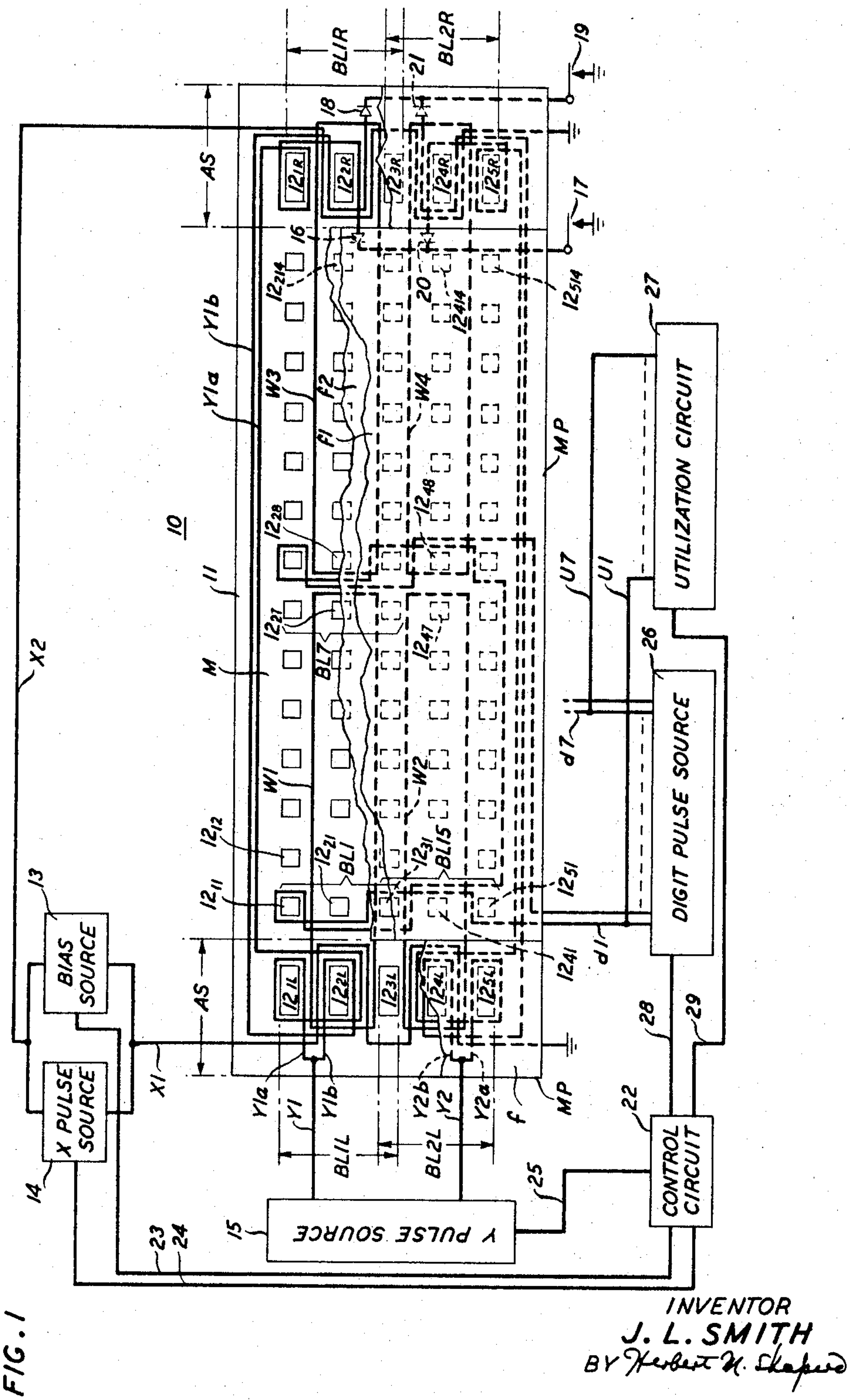
FIG. 1 is a schematic illustration of an integral unit comprising a piggy-back waffle iron memory and access switch in accordance with this invention.
Figures 5, 6A, 6B:
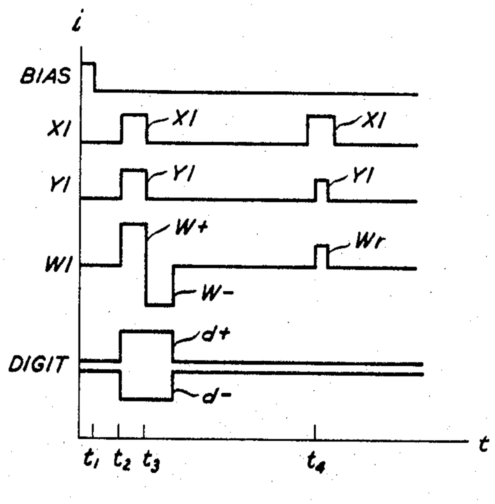
Figures 6C, 6D, 9:
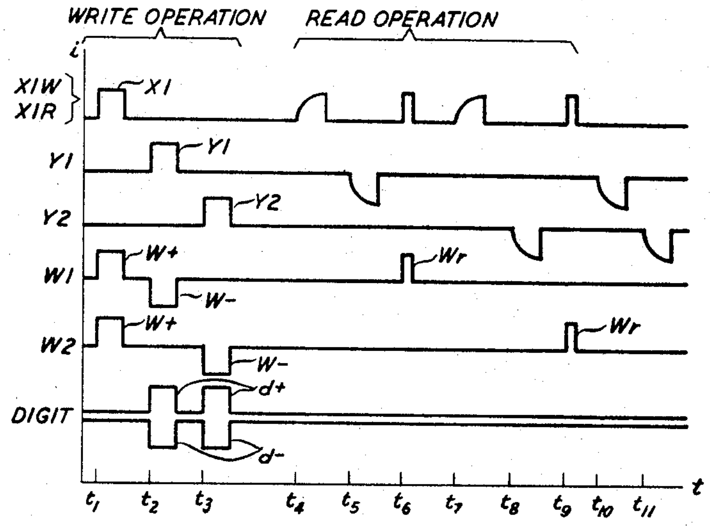
Figure 8:
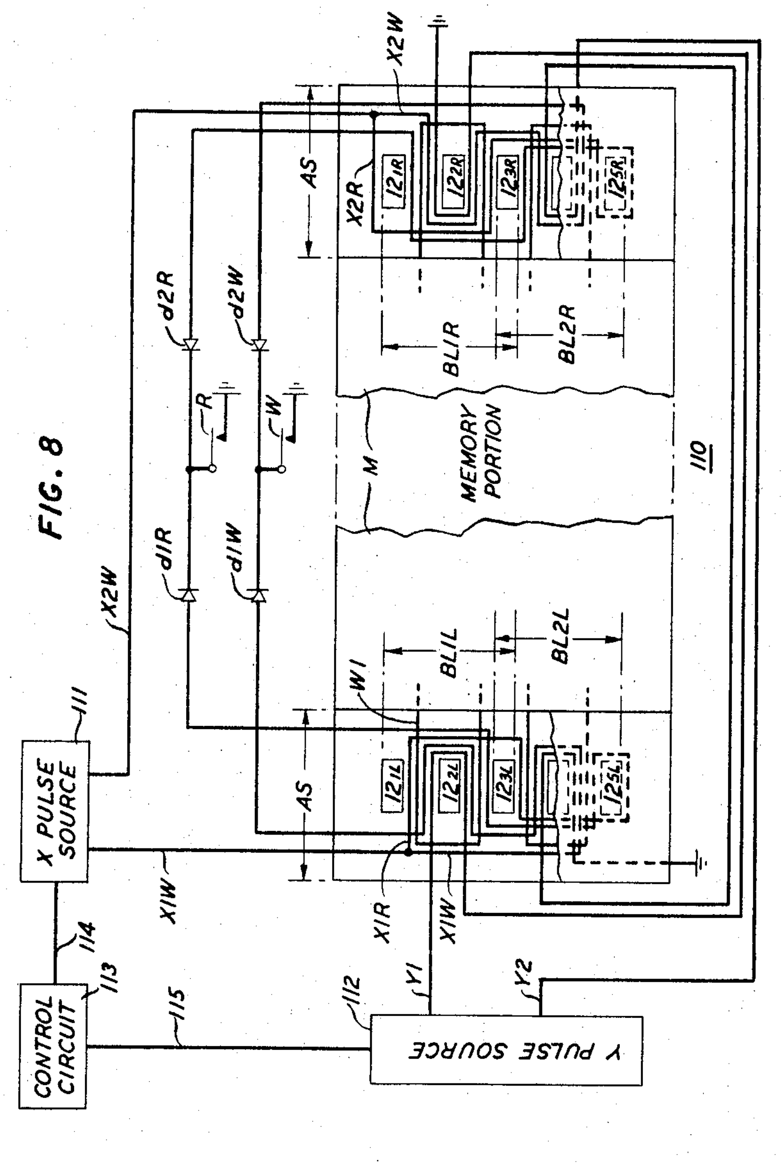
Figure 7A:
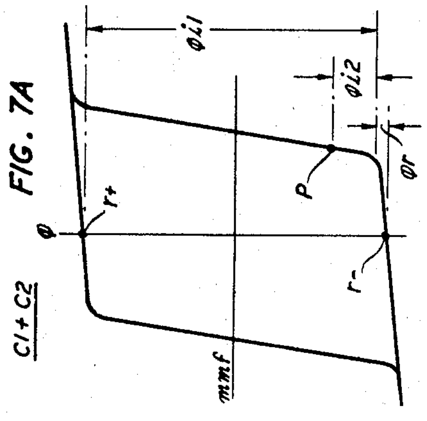
Figure 7B:
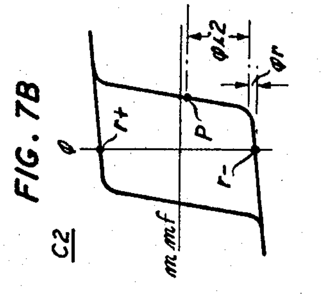

FIGS. 3*a* and 3*b* are representative cross sections through the access switch and the memory portion of the memory unit as shown in FIG. 2;

FIG. 4 is a chart illustrating the various conditions to which flux in the access switch of FIG. 1 is driven during operation in accordance with the invention;

FIG. 5 is a pulse diagram illustrating, inter alia, the access switch input pulses producing, and the memory input pulses resulting from, the flux conditions of FIG. 4;

FIGS. 6*a*, 6*b*, 6*c*, and 6*d* are charts illustrating the various conditions to which flux in a representative bit location of the memory of FIG. 1 is driven during operation in accordance with this invention;

FIGS. 7*a* and 7*b* are hysteresis characteristics for a representative location of an access switch in accordance with this invention;

FIG. 8 is a schematic illustration of a portion of an alternative access switch arrangement for integration with the memory portion of FIG. 1; and FIG. 9 is a pulse diagram illustrating, inter alia, the access switch input pulses producing, and the memory input pulses resulting from, the various flux conditions in the locations of the access switch of FIG. 8.

FIG. 1 shows a piggy-back waffle iron memory unit 10 including a piggy-back waffle iron memory M integral with a two-core-per-location access switch AS in accordance with this invention. Specifically, the memory unit 10 includes a memory plane MP comprising a relatively low reluctance base plate 11 having posts 12 protruding therefrom. The posts are organized into center and right and left groups as viewed in the figure. The center group defines the memory portion designated M; the right and left groups define the access switch designated AS. The posts of the memory portion are arranged illustratively in rows and columns, and, accordingly, each posts designation bears subscripts corresponding to the row and column in whcih it is positioned. Each of the groups of the access switch comprises a single column of posts, the designations for the posts therein bear, as subscripts, increasingly larger numerals starting at "1," from top to bottom, as viewed in the figure. The added designations R and L to these subscripts distinguish right and life portions of the switch also as viewed in the figure.

Juxtaposed with the posts of the memory portion are two overlay films, a first film $f1$ of relatively high coercive force material and a second film $f2$ of relatively low coercive force material positioned between the first film and the posts. Typically, these films are 1/8 mil thick Permalloy for the low coercive force material and 1/2 mil Permalloy for the high coercive force material. Such films are available commercially. The end groups of posts have juxtaposed therewith a 1 to 1.5 mil film of Permalloy, designated $f$, having, substantially, the relative high coercive force of the first overlay film $f1$.

A first conductor, designated $x1$, threads in an alternating sense between the posts of the left group of posts in the access switch. The conductor $x1$ is connected electrically in parallel to a bias source 13 and an $x$ pulse source 14 at one end and to ground at the other end. A second conductor, designated $x2$, threads between the posts of the right group of posts in mirror image fashion and is similarly connected between bias source 13 and the $x$ pulse source 14 at one end, and to ground at the other. A third conductor, designated $y1$, is connected at one end to a $y$ pulse source 15. The conductor $y1$ is bifurcated, current flowing controllably as will become apparent hereinafter in one path or the other therein. Two separate conductors may be used alternatively. The two parts of conductor $y1$ are designated $y1a$ and $y1b$. Conductor $y1a$ threads between posts $12_{1L}$ and $12_{2L}$ in a first sense, between post $12_{1L}$ and post $12_{11}$ of the memory portion, about post $12_{1L}$, between posts $12_{2L}$ and $12_{3L}$ in said first sense, threads between the corresponding posts on the right portion of the access switch in mirror image fashion, through diode 16 and normally open switch 17 to ground. In this connection, switch 17 may be any normally open switch which functions in accordance with this invention. Conductor $y1b$ threads between posts $12_{1L}$ and $12_{2L}$ in a first sense, between post $12_{2L}$ and post $12_{21}$ of the memory portion, between posts $12_{2L}$ and $12_{3L}$ in a second sense, threads between the corresponding posts of the right portion of the access switch in mirror image fashion, through diode 18 and through normally open switch 19 to ground. Switch 19, as switch 17, may be any switch capable of performing as required in accordance with this invention. A fourth conductor, designated $y2$, also is bifurcated, the two paths thereof being designated $y2a$ and $y2b$. Conductor $y2a$ threads between posts $12_{5L}$ and $12_{4L}$ in a first sense, between post $12_{5L}$ and post $12_{51}$ of the memory portion, about post $12_{5L}$, between posts $12_{4L}$ and $12_{3L}$ in said first sense, threads the corresponding posts of the right portion of the access switch in mirror image fashion, through diode 20, through normally open switch 17 to ground. Conductor $y2b$ threads between posts $12_{5L}$ and $12_{4L}$ in a first sense, between post $12_{4L}$ and post $12_{41}$ of the memory portion, between posts $12_{4L}$ and post $12_{3L}$ in a second sense, threads the corresponding posts of the right portion of the access switch in mirror image fashion, through diode 21, through normally open switch 19 to ground. Bias source 13, $x$ pulse source 14, and $y$ pulse source 15 are connected to a control circuit 22 by means of conductors 23, 24, and 25, respectively. A fifth conductor forms a closed loop about post $12_{2L}$ and about posts $12_{21}$ through $12_{27}$ of the memory. Similar conductors form closed loops about post $12_{4L}$ and posts $12_{41}$ through $12_{47}$, about post $12_{2R}$ and posts $12_{214}$ through $12_{28}$, and about post $12_{4R}$ and posts $12_{414}$ through $12_{48}$. These conductors comprise the word conductors of the memory and, accordingly, are designated $w1$, $w2$, $w3$, and $w4$, respectively. A plurality of conductors, designated "digit conductors," thread between the posts of the memory portion. Each one of these conductors threads about the posts of two columns of posts in the memory. Thus, there are seven digit conductors designated $d1$, $d2$, . . . , $d7$. These conductors are identical. Accordingly, only conductor $d1$ is shown in FIG. 1; conductor $d7$ is represented by incomplete lines so designated. Only conductor $d1$ is described. Specifically, conductor $d1$ originates and terminates at a digit pulse source 26, threading in a first sense between post pairs $12_{51}$–$12_{41}$ and $12_{41}$–$12_{31}$, and in a second sense between post pairs $12_{31}$–$12_{21}$ and $12_{21}$–$12_{11}$. The digit conductor $d1$ also threads, in identical fashion, the posts of the eighth column. Each digit conductor is further connected to a utilization circuit 27. These connections are represented by lines designated U1 and U7; the connections to the remaining digit conductors (not shown) are omitted. The digit pulse source 26 and the utilization circuit 27 are connected to control circuit 22 by means of conductors 28 and 29.

An understanding of the physical arrangement of the memory unit of FIG. 1 is facilitated with reference to the following brief discussion of its functional organization. The memory portion of the memory unit functions on a word-organized basis. Further, each word is arranged in a two-core-per-bit organization. In a waffle iron configuration, two-core-per-bit organization is realized through three adjacent posts, the portion of the base plate therebetween, and the overlay therebetween.

FIG. 2 shows three adjacent posts $12_{11}$, $12_{21}$, and $12_{31}$ of the memory portion of FIG. 1 and, further, shows three adjacent posts $12_{1L}$, $12_{2L}$, and $12_{3L}$ of the left portion of the access switch. FIGS. 3*a* and 3*b* show representative cross sections through sets of posts $12_{1L}$, $12_{2L}$, and $12_{3L}$, and through $12_{11}$, $12_{21}$, and $12_{31}$ taken along broken line B–B′, and Z–Z′ of FIG. 2, respectively. An equivalent "core" can be seen in each of the figures along broken closed lines designated C1 and C2. Information storage is effected in the overlay as is well known. Accordingly, posts $12_{11}$, $12_{21}$, and $12_{31}$ define one bit location, designited BL1, in the central memory portion of FIG. 1. Similarly, posts $12_{31}$, $12_{41}$, and $12_{51}$ define a second bit location, designated BL15, in the central memory portion of FIG. 1. Seven adjacent bit locations (that is, BL1 through BL7) are organized into one word by each word conductor. The memory M, thus, is organized into four binary words each comprising seven bit locations, the axes of the bit locations being generally orthogonal to the axes of the words. That is to say, the bit locations are organized along columns, the words are organized along rows.

As each set of three adjacent posts in the memory defines a bit location, so does each set of three adjacent posts in the access switch define a functional unit. Although the functional unit in the access switch is, normally, not thought of as a bit location, the physical arrangement therof is similar and it is so designated herein. Thus, posts $12_{1L}$, $12_{2L}$, and $12_{3L}$ define a location designated BL1L; the posts $12_{3L}$, $12_{4L}$, and $12_{5L}$ define a bit location designated BL2L. The corresponding posts of the right portion of the access switch define locations designated BL1R and BL2R. Thus, the access switch comprises four functional units. The functional units of the access switch are called merely "locations" herein.

Each functional unit (location) of the access switch is operated in a manner consistent with the operation of a conventional biased core access switch as will become apparent hereinafter. In accordance with this invention, however, the Y conductors therof are bifurcated to provide in connection with a bias conductor, controllably, series switching or, alternatively, single switching of the flux in the two "cores" of each location. In this manner, pulses of differing amplitudes and polarities are induced controllably in the word conductor coupled thereto. Information is written into the memory portion by the presence of positive or negative pulses on the proper digit conductors in coincidence with these pulses on the word conductor, in accordance with the following illustrative embodiment.

An illustrative operation of the memory unit 10 in accordance with this invention will now be described. Since the illustrative memory portion M is word-organized and includes seven bit locations each, the illustrative word 1011010 will be stored and read out of the memory. Each bit location therein stores information alike, however. Accordingly, the storage and retrieval (read out) of both a binary "1" and a binary "0" will be discussed in connection with a representative bit location, and the discussion, then, will be extended to the storage of an illustrative word in accordance with the assumed operation First, the operation of a representative location of the access switch and the noises induced on an associated word conductor by that operation, will be described. A representative location BL1L of the access switch is shown in FIGS. 2 and 3*a* as has been stated hereinbefore. When that representative location is operated in accordance with this invention, the flux therein is driven (by the pulses shown in FIG. 5) to various flux patterns which are shown in FIG. 4. Initially, at a time designated *t1* in FIG. 5, a negative bias is applied to conductors *x*1 and *x*2 by bias source 13 under the control of control circuit 22. The flux in the cores C1 and C2 of the representative location of the access switch is, in response thereto, in a residual condition shown in row four of FIG. 4. This will be explained more fully hereinafter. In this connection, bias source 13, the pulse sources 14 and 15 described herein, and control circuit 22 may be any bias source, pulse sources and circuit, respectively, capable of performing in accordance with this invention. Also in this connection, FIG. 5 is a plot of current versus time for the various drive pulses in accordance with this invention. The term "negative" characterizes a flow of current toward a source. In contradistinction, the term "positive" characterizes current flow away from a source.

Coincident positive pulses are then applied, at an arbitrary later time designated *t2* in FIG. 5, to conductors *x*1 and *y*1 by means of pulse sources 14 and 15, respectively, under the control of control circuit 22. The pulse on the *x*1 conductor, termed the *x*1 pulse, is of sufficient amplitude to compensate for the negative bias there. The coincident pulse on the *y*1 conductor, termed the *y*1 pulse, is of sufficiently large amplitude to switch the direction of flux in the cores coupled to it. For this operation, termed the "clear" operation, switch 19 is closed, by conventional means (not shown) under the control of control circuit 22. Switch 19 enables (grounds) conductor *y*1*b* which, then, carries the *y*1 pulse. In this connection, diode 18 is poled to permit current to flow under these circumstances. The other diodes described herein perform similarly. Since the positive *x*1 pulse compensates for the negative bias at location BL1L, only the *y*1 pulse is effective, from a standpoint of flux switching, at this time. Consequently, the positive pulse *y*1 drives the flux in core C1 of location BL1L clockwise and drives the flux in core C2 there counter-clockwise (see FIG. 3). Location BL1R is subjected to a continuing bias and the *y*1 pulse but not the *x*1 pulse. Consequently, as long as the *y*1 pulse exceeds the bias by less than the threshold value for location BL1R, only insignificant flux shuttling occurs there. In this connection, isolation means (not shown) is provided to enable only the *x*1 or, alternatively, the *x*2 conductor to be pulsed at a given time.

FIG. 4 shows the flux directions in only the overlay *f* of cores C1 and C2 of location BL1L. The flux is represented in the first row, designated "clear," of FIG. 4, as arrows directed to the right and to the left, respectively, for cores C1 and C2 as viewed in the figure. In this connection, an arrow may be taken as one unit of flux. (For a direct correspondence between the orientation of the memory unit portion shown in FIG. 2 and the arrows in FIGS. 4, 5, 6*a*, 6*b*, 6*c*, and 6*d* herein, rotate FIG. 2 ninety degrees counterclockwise.) The switching of flux as described in response to the *y*1 pulse induces a pulse in word conductor *w*1 which is proportional to the flux switched in both cores C1 and C2. The term "series switching" is used herein to designate the switching of the cores C1 and C2 of a location of the access switch. The pulse induced in a word conductor *w* in response to such series switching at this time is designated the *w*+ pulse. The directions of the *w*+ pulse in conductor *w*1 and the corresponding applied *y*1 pulse are indicated by arrows in FIG. 2. The *y* + pulse is directed to the left and to the right for cores C1 and C2 of bit location BL1, respectively the *y*1 pulse is directed to the right and to the left for cores C1 and C2 of location BL1L, respectively. The directions are as viewed in the figure.

At the termination of the *x*1 and *y*1 pulses at a time designated *t3* in FIG. 5, only the negative bias remains on conductor *x*1. This bias switches counterclockwise and clockwise, respectively, flux in cores C1 and C2 of location BL1L. This pattern is shown in the second row of FIG. 4, designated "write" (bias), by arrows directed to the left and to the right for cores C1 and C2, respectively. The series switching of flux in response to the bias induces a pulse in conductor *w*1. The pulse, at this time, is designated a *w*− pulse and is directed to the right through core C1 and to the left through core C2 (of bit location BL1 of the memory) as represented by the arrows referenced *w*− in FIG. 2.

Location BL2L, during the operation described, is subjected to a continuing bias and the *x*1 pulse but not the *y*1 pulse. Consequently, only insignificant flux shuttling occurs therein.

Subsequently, at an arbitrary time designated *t4*, an *x*1 pulse and a relatively low amplitude *y*1 pulse are applied to the *x*1 and *y*1 conductors by pulse sources 14 and 15, respectively, under the control of control circuit 22. The pulse on the *x*1 conductor at this time may be applied earlier than that on the *y*1 conductor. The former pulse also may be of longer duration. This is consistent with conventional practice to reduce noise. In this connection, these pulses are shown to be different in FIG. 5. For this operation, switch 17 is closed and switch 19 is opened also under the control of control circuit 22 and, consequently, conductor *y*1*a* conducts during this operation. The *y*1 pulse in conductor *y*1*a* drives the flux in cores C1 and C2 in a like direction. In response thereto, the flux in core C1 is partially (irreversibly) switched clockwise. The flux in core C2 remains unswitched, experiencing only insignificant shuttle flux in response to the pulse. The resulting flux pattern is a represented by the arrows in the third row of FIG. 4, designated "read." Specifically, the arrows are directed to the right for cores C1 and C2 as shown in the figure. It it noted that the flux in only one core, C1, is partially reversed (indicated by the shortened arrow for core C1 in row three of FIG. 4), and a correspondingly low amplitude pulse is induced in the word conductor *w*1. In this connection, flux in the access switch is partially switched during the period in which the corresponding bit location of the memory is producing an output pulse. This is because relatively little flux is necessary to switch flux in the low coercive force overlay there. The pulse induced thereby is designated *wr* and is represented in FIG. 2 by arrows directed to the left and to the right, respectively, for cores C1 and C2 of bit location BL1 there. The switching of flux in only one core of an access switch location is termed "single switching" herein.

It is noted that for inducing the *w*+ and the *w*− pulses in conductor *w*1, both cores C1 and C2 of location BL1L are coupled by the *y*1*b* and *x*1 conductors in a series-aiding mode providing a pulse corresponding to the flux of a hysteresis characteristic equivalent to both cores. For inducing the *wr* pulse in conductor *w*1, both cores C1 and C2 of location BL1L are coupled by the *y*1*a* and *x*1 conductors in a series-opposing mode providing flux corresponding to the hysteresis characteristic of only one core, core C2 thereof.

At the termination of the *w*+, the *w*−, and the *wr* pulses, only the bias remains driving flux pattern in cores C1 and C2 of location BL1L to a residual flux state identical to that designated "write" and shown in the second row of FIG. 4. The residual pattern is shown separately in row four of FIG. 4 as stated hereinbefore. The pulses delivered to conductor *w*1 by the location BL1L of the access switch in response to the drive pulses described are summarized in FIG. 5, where the *w*+, *w*−, and *wr* pulses are shown in sequence, on the plot of current versus time, for word conductor *w*1 as described.

Although the operation of the access switch has been described in terms of a timed sequence, such a sequence is not fixed or even necessary. Specifically, from the residual condition of row four of FIG. 4 and from the identical condition shown in row two of FIG. 4, either "read" or, alternatively, "clear" conditions can be provided directly.

For alternative storage of binary "1's" and "0's" in the representative bit location BL1 of the memory portion of the memory of FIG. 1, positive and negative pulses, termed "digit pulses," are applied to the digit conductor *d*1 coincidently with the *w*+ and *w*− pulses on the word conductor *w*1. This is illustrated by the positive and negative pulses designated *d*+ and *d*− in FIG. 5. The resulting flux patterns in the bit location BL1 of the memory portion M depend on the information previously stored there. All possible cases will be discussed.

The pertinent flux patterns when a binary "1" is stored in a representative bit location already including therein a binary "0" are shown in FIG. 6*a*. The initial flux condition of bit location BL1 is represented in the first row of FIG. 6*a* by arrows directed to the right for both cores C1 and C2. These arrows represent the flux direction in the high coercive force material of overlay *f*1 there. The flux direction for the low coercive force material of overlay *f*2, of course, is opposite. This is consistent with the operation of piggy-back memories where the high coercive force material resets the low coercive force material at the termination of the read pulse providing nondestructive read out. The series switching of both cores C1 and C2 of location BL1L of the access switch, as is indicated by a comparison between the flux pattern of the first row of FIG. 4 and that of the fourth row there, induces in conductor *w*1 a pulse *w*+ as shown in FIG. 5. This *w*+ pulse is induced coincidently with the application of a positive pulse *d*+ on digit conductor *d*1 as shown in FIG. 5. In this connection, the digit pulse is applied by digit pulse source 26 under the control of control circuit 22. The pulses *w*+ and *d*+ are in the same direction for core C1 and in opposite directions for core C2 of bit location BL1 as shown by the arrows, so designated, in FIG. 2. Accordingly, the magnetic fields associated therewith reverse the direction of flux in core C1 but not in core C2. The right-hand rule shows us that switching is upward as viewed in FIG. 5, or, in other words, to the left in the high coercive force overlay of core C1. The resulting flux pattern is as represented by the arrows directed to the left and to the right for cores C1 and C2, respectively, in the second row of FIG. 6*a*. This is called the "clear" condition for the representative bit location BL1.

The flux pattern shown in the second row of FIG. 4 is achieved in response to the bias only. Flux is seen to reverse in both cores C1 and C2 of location BL1L inducing, in conductor *w*1, the negative write pulse *w*− shown in FIG. 5. This negative pulse and the coincident positive digit pulse are in opposite directions for core C1 and in the same direction for core C2 of bit location BL1. Accordingly, the magnetic fields associated therewith oppose each other for core C1 and aid for core C2, causing flux reversal in the latter only. The resultant flux pattern is shown in the third row of FIG. 6*a*, designated write "1" H (for high coercive force material) as arrows directed to the left therein. The flux in the low coercive force material, of course, is directed in the opposite direction, as shown in row four of FIG. 6*a*, designated write "1" L (for low coercive force material).

The flux pattern shown in the third row of FIG. 4 is a result of the bias and coincident *x*1 and low amplitude *y*1 pulses in the *x*1 and *y*1*a* conductors. In response thereto, only the flux in core C1 partially switches (reverses), inducing in conductor *w*1 a pulse *wr*, shown in FIG. 5. This pulse is directed to the left for core C1 and to the right for core C2 as shown in FIG. 2 by the arrows so designated there. This pulse alone (the digit pulse is now terminated as shown in FIG. 5) is of sufficient amplitude to switch only the low coercive force material of overlay *f*2 for these cores. For cores C1 and C2, the flux in the low coercive force material is directed to the right as shown in the fourth row of FIG. 6*a*. By the right-hand rule, the flux in the low coercive force material of core C1, in response to the pulse *wr*, is switched upward as shown in FIG. 2, or, in other words, to the left as shown in FIG. 6*a* in the sixth row. The flux in the high coercive force material is substantially unaffected as shown by row five of FIG. 6*a*. At the termination of the *wr* pulse, of course, the magnetic field of the high coercive force material resets the low coercive force material to the right. The flux in the core C2 is merely shuttled further into saturation and back in response to the pulse *wr*. The switching of the low coercive force material of core C1 induces a pulse in the digit conductor *d*1, negative with respect to the end of the conductor designated *d*1. This pulse is conducted via conductor U1 to utilization circuit 27. The continuing bias induces in conductor *w*1 a pulse therein of opposite polarity at the termination of the *wr* pulse; this pulse may be ignored. It can be seen from the above that the *w*+ pulse and the coincident *d*+ pulse (compare arrows in FIG. 2) switch the flux in only core C1 of the selected bit location as shown in row two of FIG. 6*a*. The pulse *w*− and the coincident *d*+ pulse switch the flux in only core C2 there as shown in row three of FIG. 6*a*.

If a binary "1" was stored in the selected bit location previously, the pulses on the word conductor and the pulse on the digit conductor drive these cores individually as described. The initial flux condition, however, precludes flux reversal and only flux shuttling results. Specifically, the first row of FIG. 6*b* shows the arrows of both cores C1 and C2 directed to the left (that is, for the high coercive force material). The pulse *w*+ and the *d*+ pulse tend to switch core C1 to the left as was the case in connection with FIG. 6*a*. Only insignificant shuttling results because for a "1" stored previously, the flux is already directed in the direction in which the pulses are urging it. Subsequently, the *w*− and the *d*+ pulses tend to switch core C2 to the left; again only shuttling results. At this juncture, however, a binary "1" is stored regardless of the prior information and the subsequent operations are identical to that described in connection with FIG. 6*a*.

The storing of a binary "0," when a "0" was stored previously and, alternatively, when a "1" was stored previously is similar to the storage of a binary "1." The primary difference in operation is that a negative digit pulse, *d*−, is used rather than a positive one. The pulses on the word conductor are as described hereinbefore. The *w*+ pulse and the *d*− pulse oppose for core C1 and aid for core C2. If a "0" were stored previously as shown in row one of FIG. 6*c*, only insignificant flux shuttling occurs in core C2. The *w*− pulse and the *d*− pulse, similarly, only shuttle core C1. At this juncture, however, a "0" is stored as is shown by comparing the third row of FIG. 6*c* with the first row of FIG. 6*a*. That is to say, flux in each of the cores is directed to the right as shown in row three of FIG. 6*c*.

The storing of a binary "0" when a "1" was stored previously also is quite similar. The initial condition for a stored "1" is shown in row one of FIG. 6*d*. The *w*+ pulse and the *d*− pulse aid for core C2 and oppose for core C1 as shown in FIG. 2. By the right-hand rule, the flux in core C2 switches downward as shown in FIG. 2 (in the high coercive force material), or, in other words, to the right as shown in row two of FIG. 6*d*. The *w*− pulse plus a *d*− pulse aid for core C1 switching the core to the right as shown in row three in FIG. 6*d*. The flux pattern now is that assumed for a binary "0." The remaining operation is substantially as described hereinbefore. The pulse *wr* drives the low coercive force material of core C1 further into saturation and switches the flux in core C2 to the right as shown in rows six of FIGS. 6*c* and 6*d*. This flux switching induces a pulse in conductor *d*1, positive with respect to the end of the conductor designated *d*1. Again this pulse is conducted via conductor U1 to utilization circuit 27. At the termination of the *wr* pulse, the resetting mechanism produces an oppositely poled output pulse. It may be noted that the resetting of the flux of the low coercive force overlay by that of the high coercive force overlay, as well as by a negative read pulse (−*wr*), induced in conductor *w*1 by the negative bias alone, are at work here. Here too, the resulting pulse may be ignored.

In accordance with the assumed illustrative word 1011010, the pulses *w*+, *w*−, and *wr* are applied to word conductor *w*1. Coincidently, positive digit pulses *d*+ are applied to digit conductors *d*1, *d*3, *d*4, and *d*6. Also coincidently, negative digit pulses *d*− are applied to digit conductors *d*2, *d*5, and *d*7. As a result of these pulses the flux patterns in the selected bit locations follow those shown in FIGS. 6*a*, 6*b*, 6*c*, and 6*d*, depending on the previous information stored there. The pulse *wr* on word conductor *w*1 (in the absence of a coincident digit pulse) induces the positive and negative output pulses via the digit conductors which pulses are conducted illustratively in parallel to utilization circuit 27 via conductors U1, U2 . . . , and U7, respectively. In this connection, utilization circuit 27 is any utilization circuit capable of utilizing an output in accordance with this invention.

A pulse on, for example, conductor *d*1 also effects the flux conditions of the bit location BL15. This is clear from FIG. 1. A digit pulse, however, is limited in amplitude to induce only insignificant flux shuttling in other bit locations in the memory coupled thereby.

FIGS. 7*a* and 7*b* show two conventional $\varphi$ versus MMF hysteresis characteristics, where $\varphi$ is the flux in Maxwells and MMF is the magnetomotive force in ampere turns. The hysteresis characteristic of FIG. 7*a* is shown larger than that of FIG. 7*b* because it represents a characteristic corresponding to that of two cores C1 and C2. The characteristic of FIG. 7*b* represents that of only one core, C2 for example. If a location coupled by a word conductor, say *w*1, has a hysteresis characteristic as shown in FIG. 7*a*, then if flux in the cores of that location are series switched, for example, from negative maximum remanence, *r*−, to positive maximum remanence, *r*+, the pulse induced in conductor *w*1 is proportional to the total flux switched, that is, $\varphi i1+\varphi r$. If the location is one of a column of locations as in the access switch of FIG. 1, the cores of other nonselected locations are pulsed (half-select), inducing, in associated conductors, pulses proportional to the reversible flux $\varphi r$. The ratio of the flux coupling the selected to that coupling the nonselected conductors is typically, fifty to one. If, during a read operation, the selected core is partially switched from the negative remanence point *r*− to a point designated P in FIG. 7*a*, then there is induced, on the conductor associated with the selected core, a much smaller pulse proportional to $\varphi i2+\varphi r$, where $\varphi i2$ is more nearly (equal to, assume approximately) equal to $\varphi r$. The pulse induced on the conductors associated with the nonselected conductors, however, is still proportional to $\varphi r$. The ratio between the pulses induced on the selected conductor and those on the nonselected conductors under these conditions is typically only five to one. If, effectively, a smaller characteristic (for example, corresponding to one-half the amount of flux) is employed during the read operation, the point P, to which flux is switched in response to a read pulse is desirably higher on the hysteresis characteristic providing a much more desirable ratio between the amplitudes of pulses induced by selected locations and those induced by nonselected locations. The ratio under these conditions is typically ten to one, an improvement by a factor of two. This improvement permits access of a number of words in the memory double that possible, for example, with a conventional bias core access switch. Since it is most economical, from the standpoint of the number of pulse sources required to drive the access switch, to utilize a square arrangement, the improvement permits, in practice, accessing of four times the number of words in a piggy-back memory arrangement than could be accessed by comparable prior art access switches.

Further, the two-core-per-bit organization of the access switch in accordance with this invention permits even further shuttle flux cancellation consistent with conventional two-core-per-bit operation. Accordingly, the pulses induced in nonselected word conductors are further reduced in accordance with this invention.

This improvement permits the use of a waffle iron configuration for the access switch itself. As a result, the access switch may be fabricated from the same waffle iron base plate. Since circuitry for such constructions is fabricated typically via well known photo-etching techniques, that is, conductor layers of materials such as copper are preshaped, spaced apart by electrical insulators such as Mylar and fitted over the posts of the waffle iron, little extra expense is incurred in the fabrication of the access switch. Consequently, the access switch is provided for, at most, a small fraction of a cent per bit per word, whereas their cost in prior art memories is about one to one and one-half cents per bit per word. Such a cost reduction renders economically feasible memories with relatively small numbers of bit locations per word.

Although the memory unit of FIG. 1 is shown in terms of a two-by-two organization, typically, such a memory includes a number of words greater than the number of bits per word. Such an organization leads to rectangular arrangements because row length is determined primarily by the number of bit locations per word. The posts of the waffle iron base plate, however, are formed, typically, by cutting techniques which contribute significantly to the cost of a waffle iron memory. It is well known that the amount of cutting is minimized by utilizing a substantially square arrangement, that is to say, an arrangement wherein the length of rows in the memory most closely approximates the length of columns. The organization of the memory of FIG. 1 permits a degree of freedom, in this connection, not realized by prior art organizations, Specifically, the unusual side by side positioning of word locations and the orthogonal arrangement of bit locations with respect thereto, and the division of the access switch consistent with the organization shown in FIG. 1 permits row lengths determined essentially independently of the number of bit locations per word. For memories of practical size, for example, a 72 word by 7 bit per word memory, this permits the use of a waffle iron plate about 2.3 inches by about 3.0 inches rather than a 1.1 inch by 6.08 inch arrangement required in accordance with prior art teaching. In this connection, a waffle iron post is typically .055 inch on a side and the slots therebetween are .020 inch. In the access switch the posts are, typically, 0.33 inch on a side. The use of a waffle iron configuration for the access switch as shown in FIG. 1 also enables a closer location of portions of the access switch and the words of the memory accessed thereby.

Waffle iron memories typically require overlay members which are relatively thin compared to the distance between posts in order to confine spreading therein. In this connection the term "spreading" relates to the maximum distance in from the edge of a post through which flux in the overlay closes. Desirable thicknesses for such overlay members are of the order of 0.001 inch (one mil). Although the overlay member may be or any material having substantially rectangular hysteresis characteristics, ferrites of suitable physical strength cannot conveniently be made so thin. Accordingly, overlay members of the desired thicknesses are typically made from metals such as molypermalloys which are commercially available alloys of molybdenum, nickel and iron. These metals in a high coercive force state useful in waffle iron memories have hysteresis characteristics which are substantially less ideal than those of the ferrite materials. In accordance with this invention, waffle iron access switches including molypermalloy overlays may be used.

Series and single switching of the cores in a location of a biased core access switch in accordance with this invention can be achieved with many winding configurations of which the embodiment of FIG. 1 is illustrative. A slightly different mode of operation, however, achieves the series and single switching results by employing a prime operation in the absence of a bias means. This mode of operation is particularly adaptable to a sequential access organization.

FIG. 8 shows a portion of a sequential access memory in accordance with this invention. In many respects the memory of FIG. 8 is quite similar to that of FIG. 1 and to the extent, that is, similar, the description thereof is simplified. Specifically, the memory (central) portion of the memory unit of FIG. 8 is identical to that of the memory portion of FIG. 1 and is not shown or described here. Similarly, the interconnection between the access switch and the memory portion is identical and, accordingly, only indicated. Only the access switch of the memory of FIG. 8 will be described, and to the extent that this switch is similar to the access switch of the memory of FIG. 1, the same designations will be used and the description thereof will be facilitated.

Specifically, the memory unit 110 of FIG. 8 includes a memory portion M (including a post arrangement not shown) which is identical with that of FIG. 1. The memory unit 110 also includes left and right groups of posts which are identical to and serve the same function (that is, as an access switch AS), as the corresponding posts of FIG. 1. In addition, the overlay arrangements (not shown) for both the access switch and the memory portion in FIG. 8 are identical to that of FIG. 1; the designations thereof in FIG. 1 are carried over to FIG. 8.

The arrangement of conductors in FIG. 8, however, is different from that of FIG. 1. This arrangement is herein discussed in detail and the pulses induced in conductor *w*1 as summarized in FIG. 5 are demonstrated as realized therewith. Operation of the memory portion of the memory unit of FIG. 8, in response to these pulses, is substantially as described hereinbefore on a per bit basis.

The access switch, then, includes a first conductor designated XIW which threads in an alternating sense the cores C2 and C1 of location BL2L and BL1L, sequentially, of the access switch AS. In this connection, the core designations are as described in connection with FIGS. 2 and 3. The conductor XIW is connected between an *x* pulse source 111 at one end, through a diode *d*1W to normally open switch W to ground at the other end. Diode *d*1*w* is poled to allow current to flow in conductor X1W when wsitch W is closed. Switch W and means for closing it are conventional and, accordingly, not discussed further. A second conductor X2W including a like diode *d*2W couples the cores of the right group of the access switch in mirror-image fashion and is similarly connected between pulse source 111, through switch W to ground. The connections to the pulse source and ground are opposite to those of conductor X1R because of current polarity considerations as will become apparent. A third conductor designated X1R couples, in one sense, the cores C1 and C2 of location BL1L, and in the opposite sense, the cores of location BL2L. The conductor X1R is connected between pulse source 111 (via conductor X1W) at one end, through diode *d*1R to normally open switch R to ground at the other end. Diode *d*1R also is poled to permit current to flow in conductor X1R when switch R is closed. A conductor, designated X2R, coupling the right group of posts of the access switch in mirror-image fashion, is connected between pulse source 111 (via conductor X2W) at one end, through diode *d*2R, through switch R to ground at the other end. A conductor, designated Y1, coupling the cores C1 and C2 of location BL1L in opposing sense and coupling the cores of location B11R in mirror-image fashion, is connected between a Y pulse source 112 and ground. A conductor designated Y2, also connected between Y pulse source 112 and ground, couples, in opposing sense, cores C1 and C2 of location BL2R and, in mirror-image fashion, location BL2L. The X and the Y pulse sources 111 and 112 are connected to control circuit 113 by conductors 114 and 115, respectively. Only four locations are shown in the illustrative access switch for accessing four words in the memory portion. For additional words, additional locations are needed in the access switch.

Operation of the embodiment of FIG. 8 in accordance with this invention, as will become apparent hereinafter, provides a flux pattern in each core of each location in the access switch as represented in row one of FIG. 4. Assuming prior operation, this flux pattern is assumed as the initial flux pattern. Initially, at a time designated *t*1 in FIG. 9 then, a positive pulse *x*1 is applied to the conductor X1W by means of the X pulse source 111 under the control of control circuit 113. (FIG. 9 is a plot of current versus time for the various pulses in accordance with this invention.) In this connection, the pulse sources and control circuit may be any sources and circuits capable of performing in accordance with this invention. Simultaneously, switch W is closed (by means not shown) also under the control of control circuit 113. In response to the positive pulse on conductor X1W, the cores C1 and C2 of locations BL1L and BL2L are driven to the left and right, respectively, as shown in the second row of FIG. 4. A comparison of rows one and two of FIG. 4 reveals that the flux in both cores of each location is reversed in response to this pulse. The conductor *w*1, accordingly, has induced therein a *w*+ (clear) pulse as shown in FIG. 5 and in FIG. 9. Conductor *w*2 (not shown) experiences a *w*+ pulse also. Thereafter, at a time designated *t*2 in FIG. 9, a positive pulse *y*1 is applied to the Y1 conductor by means of the Y pulse source 112 under the control of control circuit 113. The positive pulse on the Y1 conductor drives the flux in cores C1 and C2 of location BL1L to the right and to the left, respectively, as shown in row one of FIG. 4, again reversing flux in both cores thereof and, consequently, inducing a negative write pulse in conductor *w*1 only. The flux in cores C1 and C2 of location BL1R, also coupled by the Y1 conductor, already is in the direction in which urged by the *y*1 pulse. A pulse designated a *y*2 pulse, at a time designated *t*3 in FIG. 9, is, similarly, applied to the *y*2 conductor in sequence, inducing a negative write pulse in conductor *w*2 only. The pulses induced in conductors *w*1 and *w*2 are represented as *w*− pulses in FIG. 5 and in FIG. 9. This concludes a representative sequential write operation, in connection with the word conductors, as indicated by the bracket so designated in FIG. 9. For writing information into the memory, digit pulses are applied coincidently with the *w*− pulses on a word conductor as described hereinbefore.

Subsequently, at an arbitrary time designated *t*4 in FIG. 9, a prime pulse is applied to conductor X1R by means of the X pulse source 111 under the control of control circuit 113. In this connection, a prime pulse is one which is of a duration and amplitude to induce only a negligible pulse in an associated word conductor. Such a pulse typically has a slow rise time as is indicated in the figure. At this time, switch W is opened and switch R is closed (by means not shown) under the control of control circuit 113. In response to this prime pulse, the flux in core C1 of location BL1L is reversed fully (to the right) in the direction shown in row three of FIG. 4. The core C2 of location BL2L, also coupled by conductor X1R is switched to a direction (not illustrated) opposite to that in which the core C1 of location BL1L is switched, that is, the arrow therein is directed to the left in overlayer *f* as viewed in FIG. 3. The word conductors are not pulsed, however, in response to this prime pulse. Next, at a time designated *t*5 in FIG. 9, a negative prime pulse is applied to the Y1 conductor by means of pulse source 112 under the control of control circuit 113. In response thereto, the flux in the core C2 of location BL1L is driven to the direction (left) shown for core C2 in row one of FIG. 4. Then, at a time designated *t*6 in FIG. 9, a typically short duration, positive pulse is applied to conductor X1R in the manner described, appropriate switches being opened and closed for this purpose. This pulse is limited in amplitude to reverse the flux in the low coercive force overlay only. Consequently, the flux in the core C2 of location BL1L partially reverses in the direction shown in row three of FIG. 4. As explained hereinbefore, this partial switching is due to the fact that an output pulse is realized only in response to the flux reversal in the low coercive force overlay of the selected bit locations. When flux reversal in that overlay is complete, the output pulse is complete. At this time, however, the core of the access switch is only partially reversed; full reversal thereof may proceed after the output pulse is realized. A comparison of row one and row three of FIG. 4 shows that the flux in only core C2 of location BL1L switches (reverses) in response to the positive pulse in conductor X1R; a read pulse, represented by pulse *wr* in FIG. 5 and in FIG. 9 is induced in conductor *w*1. A like sequence of drive pulses, that is, a prime pulse applied to conductor X1R, a negative prime pulse applied to conductor Y2 and a positive pulse applied to conductor X1R at times designated *t*7, *t*8, and *t*9, respectively, induce a read pulse, selectively, in conductor *w*2. This concludes a representative sequential read operation as indicated by the bracket so designated in FIG. 9. After the read operation, which is sequential, negative prime pulses are applied at times designated *t*10 and *t*11, sequentially, to conductors Y1 and Y2, as described, to return the flux to the pattern of row one of FIG. 4. It may be noted that the *w*+ pulse described cleared both word conductors *w*1 and *w*2. For sequential write operations, sequential *w*− pulses are induced in conductors *w*1 and *w*2 sequentially, each coincidently with a separate digit pulse of desired polarity; this is indicated in FIG. 9. To the extent that the digit pulse is not coincident with the *w*+ pulse as described in connection with the embodiment of FIG. 1, the resulting flux patterns in the memory as shown in FIGS. 6*a*, 6*b*, 6*c*, and 6*d* are modified. Operation in connection with locations BL1R and BL2R is analogous. It is to be noted that the operation of the memory of FIG. 8 was described in terms of a sequence of pulses for illustrative purposes. The memory, however, is of the nondestructive read type, and, accordingly, the read operation may be repeated without further write operations as described. Once again series switching and single switching of the cores of a location of an access switch in accordance with this invention are realized. It may be noted that the prime pulses on the Y1 conductor or, alternatively, on the Y2 conductor enable only one location to produce a read pulse in the associated word conductor.

What have been described are considered to be only illustrative embodiments of the present invention. Accordingly, it is to be understood that other and numerous arrangements may be devised by one skilled in the art without departing from the spirit and scope of this invention.

What is claimed is:

1. A multilocation access switch including two cores per location, said cores comprising material having substantially rectangular hysteresis characteristics, and drive means coupled to the cores of each of said locations in a manner to switch flux in only enabled ones of said cores, said last-mentioned means including means for enabling both cores or one of said cores at each of said locations selectively.

2. An access switch in accordance with claim 1 in combination with a word-organized piggy-back waffle iron memory, said memory including a plurality of word conductors, each of said word conductors being coupled to both cores of a location of said access switch.

3. An access switch in accordance with claim 1 wherein said drive means includes first and second pulse sources connected, respectively, to a first conductor and a bifurcated second conductor having first and second portions, said means for enabling including switching means for selectively enabling said first and second portions thereof simultaneously with pulses from said first and second pulse sources.

4. An access switch in accordance with claim 3 wherein said first conductor and said first portion of said bifurcated second conductor are coupled to the cores of each of said locations in like senses, and wherein the first conductor and said second portion of said bifurcated second conductor are coupled to one core of each location in a like sense and to the other core of each location in opposite senses.

5. An access switch in accordance with claim 1 wherein each of said locations comprises a substantially low reluctance base plate having three posts thereon and an overlay member juxtaposed with said posts, adjacent posts of each location defining said cores thereabout.

6. An access switch in accordance with claim 5 wherein said drive means includes first and second pulse sources connected, respectively, to a first conductor and to a bifurcated second conductor having first and second portions, said second conductor including switching means for selectively enabling said first and second portions thereof simultaneously with pulses from said first and second pulse sources.

7. An access switch in accordance with claim 6 wherein said first conductor and said first portion of said bifurcated second conductor are coupled to the cores of each of said locations in like senses, and wherein the first conductor and said second portion of said bifurcated second conductor are coupled to one core of each location in a like sense and to the other core of each location in opposite senses.

8. An access switch in accordance with claim 6 wherein said drive means also includes a bias source connected to said first conductor.

9. An access switch in accordance with claim 8 in combination with a word-organized piggy-back waffle iron memory, said memory including a plurality of word conductors, each of said word conductors being coupled to both cores of a location of said access switch.

10. A combination in accordance with claim 9 wherein said memory includes a low reluctance base plate integral with the base plate of said access switch.

11. A magnetic memory comprising a low reluctance base plate having a plurality of posts thereon, said posts being organized in first and second groups, the posts of said second group being arranged generally in rows and columns, the posts of said first group being arranged in a column, a first overlay juxtaposed with the posts of said first group of posts, second and third overlays juxtaposed with the posts of said second group of posts, said second overlay overlying said third overlay, said first, second and third overlays comprising material having substantially rectangular hysteresis characteristics, said second overlay being characterized by a coercive force higher than that of said third overlay, corresponding first, second, and third posts in each column of said first and second groups defining bit locations thereabout, adjacent posts in each of said bit locations defining a core thereabout, first and second conductors coupled to the first and second cores of the locations of said first group of posts in series-aiding and series-opposing fashion, respectively, a third conductor coupled to the cores of each location in said first group of posts in series opposing fashion, a plurality of closed-loop conductors each coupled to both cores of a location in said first group of posts and both cores of the corresponding bit location in each column of said second group of posts, and a plurality of fourth conductors each coupled to the cores of each bit location in a column of said second groups of posts.

12. A magnetic memory in accordance with claim 11 including a first pulse source connected to said first and second conductors a second pulse source and a bias source connected to said third conductor, switching means connected to said first and second conductors for selectively enabling said first and second conductors simultaneously with a pulse from said first pulse source, and a third pulse source connected to said plurality of fourth conductors.

13. First and second magnetic memories each in accordance with claim 11 disposed in mirror image relationship with each other on a common low reluctance base plate.

14. First and second magnetic memories in accordance with claim 13 wherein corresponding conductors in each are connected electrically in series.

15. First and second magnetic memories in accordance with claim 14 including a first pulse source connected to said first and second conductors, a second pulse source and a bias source connected to said third conductors, switching means connected to said first and second conductors for selectively enabling said first and second conductors simultaneously with a pulse from said first pulse source, and a third pulse source connected to said plurality of fourth conductors.

16. A magnetic memory in accordance with claim 15 also including a control means connected to said first and second sources for the activation thereof in a manner to provide series switching and single switching of the cores of a selected location.

17. A magnetic memory comprising a low reluctance base plate having a plurality of posts thereon, said posts being organized in first and second groups, the posts of said second group being arranged generally in rows and columns, the posts of said first group being arranged in a column, a first overlay juxtaposed with the posts of said first group of posts, second and third overlays juxtaposed with the posts of said second group of posts, said second overlay overlying said third overlay, said first, second and third overlays comprising material having substantially rectangular hysteresis characteristics, said second overlay being characterized by a coercive force higher than that of said third overlay, corresponding first, second, and third posts in each column of said first and second groups defining bit locations thereabout, adjacent posts in each of said bit locations defining a core thereabout, first and second conductors coupled to the first and second cores of the locations of said first group of posts in series-aiding and series-opposing fashion, respectively, a plurality of third conductors each coupled to a location of said first group of posts in series-opposing fashion, a plurality of closed-loop conductors each coupled to both cores of a location in said first group of posts and both cores of the corresponding bit location in each column of said second group of posts, and a plurality of fourth conductors each coupled to the cores of each bit location in a column of said second groups of posts.

18. First and second magnetic memories in accordance with claim 17 disposed in mirror-image relationshp wth each other on a common low reluctance base plate wherein corresponding conductors in each are connected electrically in series.

19. A magnetic memory in accordance with claim 18 wherein said first and second conductors are connected to a first source of prime and drive pulses, and wherein said third conductor is connected to a second source of prime and drive pulses.

20. A magnetic memory in accordance with claim 18 also including a control means connected to said first and second sources for the activation thereof in a manner to provide series switching and single switchng of the cores of a selected locaton.

References Cited

UNITED STATES PATENTS

| | | | |
|---|---|---|---|
| 2,768,367 | 10/1956 | Rajchman | 340—174 |
| 3,004,172 | 10/1961 | Bader | 307—88 |
| 3,008,054 | 11/1961 | Saltz | 307—88 |
| 3,274,571 | 9/1966 | Bobeck et al. | 340—174 |

BERNARD KONICK, *Primary Examiner.*

J. F. BREIMAYER, *Assistant Examiner.*